United States Patent [19]

Ono et al.

[11] Patent Number: 5,414,058
[45] Date of Patent: May 9, 1995

[54] POWDER COATING COMPOSITION COMPRISING CONVENTIONAL EPOXIDES WITH CRYSTALLINE EPOXIDES AND CURING AGENTS

[75] Inventors: Kazuya Ono, Tokyo; Tetsuo Miyake; Mikio Osa, both Saitama; Katuji Kitagawa, Kasukabe; Masao Kubo, Koshigaya, all of Japan

[73] Assignee: Somar Corporation, Japan

[21] Appl. No.: 91,742

[22] Filed: Jul. 15, 1993

Related U.S. Application Data

[63] Continuation-in-part of Ser. No. 705,913, May 28, 1991, abandoned.

[30] Foreign Application Priority Data

May 28, 1990 [JP] Japan .................. 2-138956

[51] Int. Cl.⁶ .............................................. C08G 59/06
[52] U.S. Cl. ................................... 525/523; 525/524; 525/525; 525/934; 525/529; 523/400
[58] Field of Search ............... 525/523, 524, 525, 934, 525/529; 523/400

[56] References Cited

U.S. PATENT DOCUMENTS

| | | | |
|---|---|---|---|
| 3,956,317 | 5/1976 | Batzer et al. | 549/333 |
| 4,255,553 | 3/1981 | Mizumura et al. | 525/119 |
| 4,339,571 | 7/1982 | Gutekunst et al. | 528/361 |
| 4,421,897 | 12/1983 | Gutekunst et al. | 525/119 |
| 4,510,272 | 4/1985 | Loszewski | 525/530 |
| 4,675,443 | 6/1987 | Bertram et al. | 549/552 |
| 4,687,832 | 8/1987 | Ehara et al. | 528/97 |
| 4,764,581 | 8/1988 | Muller et al. | 549/557 |
| 4,816,531 | 3/1989 | Young | 525/488 |
| 4,920,164 | 4/1990 | Sasaki et al. | 523/466 |

FOREIGN PATENT DOCUMENTS

| | | |
|---|---|---|
| 61-55123 | 3/1986 | Japan . |
| 6286078 | 4/1987 | Japan . |
| 62-115057 | 5/1987 | Japan . |
| 63-227622 | 9/1988 | Japan . |

*Primary Examiner*—John C. Bleutge
*Assistant Examiner*—Randy Gulakowski
*Attorney, Agent, or Firm*—Lorusso & Loud

[57] ABSTRACT

A powder coating composition includes one or more crystalline substances the lowest melting point of which is Mp and one or more non-crystalline substances the lowest glass transition point of which is Tg and is lower than Mp, wherein the crystalline and non-crystalline substances are selected from epoxy resins and curing agents and bonded to each other. The bonding is effected by maintaining a powdery mixture containing the crystalline and non-crystalline substances at a temperature higher than Tg but lower than Mp and the softening point of any of the the non-crystalline substances, optionally under a pressure, and cooling and pulverizing the resulting mixture.

18 Claims, No Drawings

POWDER COATING COMPOSITION COMPRISING CONVENTIONAL EPOXIDES WITH CRYSTALLINE EPOXIDES AND CURING AGENTS

This application is a continuation-in-part of application Ser. No. 07/705913, filed May 28, 1991, now abandoned.

BACKGROUND OF THE INVENTION

This invention relates to an epoxy resin powder coating composition and a process for the preparation thereof.

Epoxy resin powder compositions have been generally prepared by the dry blending method, melt blending method or press-bonding blending method. In the dry blending method, an epoxy resin powder and a curing agent powder are mixed with each other as such. While the dry blending method is advantageous because the mixing can be easily carried out, this method has a problem because the epoxy resin and the curing agent tend to be separated from each other during transportation or use due to the difference in specific gravity and/or particle size therebetween.

The melt blending method includes the steps of mixing a melted epoxy resin with a melted curing agent, cooling and solidifying the resulting mixture, and pulverizing the solidified mixture. The melt blending method is free of such a problem of separation of the respective ingredients as seen in the dry blending method. However, another problem is encountered because crystal structures of the epoxy resin and/or the curing agent are destroyed during the melting stage. The presense of crystalline ingredients is highly desired because the composition can exhibits a low viscosity when melted during the curing stage so that it can smoothly penetrate into gaps to be filled therewith for bonding.

The press-bonding blending method is a modification of the above dry blending method and includes the steps of dry-blending epoxy resin powder with curing agent powder, pressing the resulting blend at a high pressure to adhere these ingredients to each other, and pulverizing the pressed blend. Though the resulting composition has a less tendency to cause separation of ingredients as compared with the dry blending method, it still involves such a problem because the adhesion between the ingredients is not sufficiently strong.

SUMMARY OF THE INVENTION

It is, therefore, an object of the present invention to provide a powder coating composition which is free of separation of respective ingredients.

Another object of the present invention is to provide a crystalline particles-containing, powder coating composition which has a low viscosity when melted for curing.

It is a further object of the present invention to provide a simple, economical process for the preparation of a powder coating composition of the above-mentioned type.

In accomplishing the foregoing objects, there is provided in accordance with the present invention a powder coating composition comprising:

one or more crystalline substances one of which is ingredient (a) having a melting point Mp which is lower than those of the other crystalline substances, and one or more non-crystalline substances one of which is ingredient (b) having a glass transition point Tg which is lower than those of the other non-crystalline substances and which is lower than said melting point Mp, wherein said crystalline and non-crystalline substances are selected from epoxy resins and curing agents and include a combination of an epoxy resin and a curing agent and wherein said crystalline and non-crystalline substances have been maintained at a temperature which is higher than said glass transition point Tg of said ingredient (b) but lower than said melting point Mp of said ingredient (a) and which is lower than any softening point of said one or more non-crystalline substances so that said crystalline and non-crystalline substances are bonded with each other with said ingredient (b) serving as a binder.

In another aspect, the present invention provides a process for the preparation of a powder coating composition, comprising the steps of:

(a) providing a mixture containing one or more crystalline substances one of which has a melting point Mp which is lower than those of the other crystalline substances, and one or more non-crystalline substances one of which has a glass transition point Tg which is lower than those of the other non-crystalline substances and which is lower than said melting point Mp, wherein said crystalline and non-crystalline substances are selected from epoxy resins and curing agents and include a combination of an epoxy resin and a curing agent;

(b) maintaining said mixture at a temperature which is higher than said glass transition point Tg but lower than said melting point Mp and which is lower than any softening point of said one or more non-crystalline substances so that said crystalline substances and non-crystalline substances are bonded with each other with said non-crystalline substance having the glass transition point Tg serving as a binder;

(c) then cooling the mixture obtained in step (b) to a temperature lower than said glass transition point Tg; and (d) then pulverizing the cooled mixture obtained in step (c).

In the present specification, "glass transition point" and "melting point" are as measured by means of a differential scanning calorimeter and "softening point" refers to Durran's softening point.

Other objects, features and advantages of the present invention will become apparent from the detailed description of the preferred embodiments of the invention to follow.

DETAILED DESCRIPTION OF THE PREFERRED EMBODIMENTS OF THE INVENTION

The powder coating composition according to the present invention contains one or more crystalline substances and one or more non-crystalline substances. These crystalline and non-crystalline substances are selected from epoxy resins and curing agents and the coating composition contains a combination of at least one of the epoxy resins and at least one of the curing agents.

Thus, the coating composition according to the present invention include the following combinations (I) through (VII):

|       | Crystalline Substance | Non-Crystalline Substance |
|-------|----------------------|---------------------------|
| (I)   | At least one epoxy resin | At least one curing agent |
| (II)  | At least one epoxy resin & at least one curing agent | At least one curing agent |
| (III) | At least one epoxy resin | At least one epoxy resin & at least one curing agent |
| (IV)  | At least one epoxy resin & at least one curing agent | At least one epoxy resin |
| (V)   | At least one curing agent | At least one epoxy resin |
| (VI)  | At least one curing agent | At least one epoxy resin & at least one curing agent |
| (VII) | At least one epoxy resin & at least one curing agent | At least one epoxy resin & at least one curing agent |

Of the above combinations, those of (III), (IV) and (VII) are preferred and the combination (VII) is most preferred.

One of the crystalline substances constituting the powder coating composition has a melting point $M_p$ which is lower than those of the other crystalline substances while one of the non-crystalline substances has a glass transition point $T_g$ which is lower than those of the other non-crystalline substances and which is lower than the melting point $M_p$. The non-crystalline substance having the glass transition point $T_g$ serves as a binder for bonding the crystalline and non-crystalline substances. This bonding is established by maintaining these crystalline and non-crystalline substances at a temperature which is higher than the glass transition point $T_g$ but lower than the melting point $M_p$ and which is lower than the softening point of any of the non-crystalline substances, so that the non-crystalline substance having the glass transition point $T_g$ becomes sticky and is adhered to the particles of the crystalline substances.

The melting point $M_p$ is preferably higher than 90° C. while the glass transition point $T_g$ is preferably in the range of 15°–75° C. The non-crystalline substances preferably have softening points higher than 50° C., preferably in the range of 60°–150° C.

Illustrative of suitable crystalline epoxy resins are as follows:
triglycidyl isocyanurate (EPIKOTE RXE-15, manufactured by Yuka-Shell Epoxy Inc., Epoxy equivalent: 103, Melting point: 120° C.),
epoxypropoxydimethylbenzylacrylamide (KANE-KARESIN AXE, manufactured by Kanegafuchi Kagaku Industry Inc., Epoxy equivalent: 270, Melting point 100° C.),
hydroquinone diglycidyl ether (HQDGE, manufactured by Nippon Kayaku K. K., Epoxy equivalent: 125, Melting point: 100° C.),
bisphenol S diglycidyl ether (EBPS-200, manufactured by Nippon Kayaku K. K., Epoxy equivalent: 200, Melting point: 125° C.),
tetramethylbisphenol diglycidyl ether (YX-4000, manufactured by Yuka-Shell Epoxy Inc., Epoxy equivalent: 185, Melting point: 105° C.),
modified tetramethylbisphenol diglycidyl ether (YL-6074C, manufactured by Yuka-Shell Epoxy Inc., Epoxy equivalent: 190, Melting point: 93° C.),
2,5-di-t-butylhydroquinone diglycidyl ether (DTBHQ-EX, manufactured by Yuka-Shell Epoxy Inc., Epoxy equivalent: 202, Melting point: 132° C.), and
terephthalic acid diglycidyl ester.

Illustrative of suitable crystalline curing agents are as follows:
5-(2,5-dioxotetrahydrofroryl) -3-methyl-3-cyclohexene-1,2-dicarboxylic anhydride (EPIKURON B-4400, manufactured by Dainihon Ink K. K., Melting point: 167° C.),
tetrahydrophthalic anhydride (Melting point: 100° C.),
bisphenol A (Melting point: 157° C.),
bisphenol S (Melting point: 245° C.),
organic acid hydrizides, and
dicyanodiamide.

Illustrative of suitable non-crystalline epoxy resins are as follows:
bisphenol A diglycidyl ether (EPIKOTE 1001, manufactured by Yuka-Shell Epoxy Inc., Epoxy equivalent: 475, Glass transition point: 29° C.; EPIKOTE 1002, manufactured by Yuka-Shell Epoxy Inc., Epoxy equivalent: 650, Glass transition point: 42° C.), and
o-cresol novolak epoxy resin (EPIKOTE 180S65, manufactured by Yuka-Shell Epoxy Inc., Epoxy equivalent: 210, Glass transition point: 18° C.).

Illustrative of suitable non-crystalline curing agents are as follows:
phenol novolak resin (TAMANOL #754, manufactured by Arakawa Kagaku K. K., Glass transition point: 49° C.), and
o-cresol novolak resin (OCN120, manufactured by Nippon Kayaku K. K., Glass transition point: 70° C.; OCN90, manufactured by Nippon Kayaku K. K., Glass transition point: 40° C.).

In the powder coating composition according to the present invention, the amount of the non-crystalline substance (or the total amount of the non-crystalline substances when two or more non-crystalline substances are used) is 15–70 parts by weight, preferably 20–60 parts by weight, per 100 parts by weight of the crystalline substance (or the total of the crystalline substances when two or more crystalline substances are used). At least 15 parts by weight of the non-crystalline substance is desirable to obtain sufficiently high bonding between the crystalline substance and the non-crystalline substance. On the other hand, when the amount of the non-crystalline substance exceeds the above specified 70% by weight upper limit, the viscosity of the coating composition when melted tends to become undesirably high. When two or more non-crystalline substances are used, it is desirable that the amount of that non-crystalline substance having the glass transition point $T_g$ is at least 10% by weight based on the total weight of the non-crystalline substances. The non-crystalline substance with the glass transition point $T_g$ is preferably an epoxy resin.

In a preferred embodiment in which crystalline and non-crystalline epoxy resins are used in combination like above combinations (III), (IV) and (VII), the amount of the non-crystalline epoxy resin or resins is generally 5–45% by weight, preferably 5–25% by weight, based on the total weight of the crystalline and non-crystalline epoxy resins.

If desired, a liquid epoxy resin such as bisphenol A diglycidyl ether (EPIKOTE 828, manufactured by Yuka-Shell Epoxy Inc., Epoxy equivalent: 190) may be incorporated into the powder coating composition.

The curing agent is used in an amount of 0.5–1.5 equivalents, preferably 0.7–1.2 equivalents of the functional group thereof per one equivalent of the epoxy group present in the coating composition.

Various additives such as a curing accelerator, a reactive organic solid material, a colorant, a flame retarder, a leveling agent, a flow rate controlling agent and a filler may be incorporated into the powder coating composition. These additives may be crystalline or non-crystalline.

Illustrative of suitable curing accelerators are as follows:
  imidazole and modified imidazole (CUREZOL 2MZ, manufactured by Shikoku Kasei Inc., Melting point: 147° C.),
  prepolymer obtained by reaction of an epoxy resin with an imidazole compound (EPICURE P-200, manufactured by Yuka-Shell Epoxy Inc., Glass transition point: 95° C.),
  triphenylphosphine, and
  phenol novolak resin salt of diazabicycloundecene (U-Cat831, manufactured by San Apro Inc.).

The curing accelerator is used in an amount of 0.1–5 parts by weight, preferably 0.3–3 parts by weight, per 100 parts by weight of the epoxy resin present in the powder coating composition.

The reactive organic solid is a substance capable of reacting with an epoxy resin during the curing stage of the powder coating composition. Illustrative of suitable reactive organic solids are as follows:
  bismaleimide-triazine resin (BT-2170, manufactured by Mitsubishi Gas Chemical Inc., Glass transition point: 42° C.), effective to improve thermal resistance of the cured body,
  bismaleimide resin (MB-3000, manufactured by Mitsubishi Yuka K. K., Melting point: 156° C.), effective to lower the viscosity of the composition when melted and to improve thermal resistance of the cured body,
  butyral resin (S-LEC BLS, manufactured by Sekisui Kagaku K. K., Glass transition point: 120° C.), effective to improve adhesion strength of the composition, and
  solid polyol such as tris(2-hydroxyethyl)isocyanurate (THEIC, manufactured by Shikoku Kasei Inc., Melting point: 135° C.), effective to improve thermal resistance and flexibility of the cured body.

The reactive organic solid is used in an amount of 10–50 parts by weight, preferably 20–40 parts by weight per 100 parts by weight of the epoxy resin present in the powder coating composition. An example of the leveling agent is an acrylate oligomer (NIKALITE XK-21, manufactured by Nihon Carbide Inc.).

The powder coating composition according to the present invention may be produced as follows. First, a mixture containing one or more crystalline substances and one or more non-crystalline substances is prepared. In this case, these substances should be so selected that the lowest glass transition temperature Tg among those of the non-crystalline substances is lower, preferably by at least 10° C., more preferably by at least 30° C., than the melting point Mp which is lowest among those of the crystalline substances and that the mixture contains a combination of an epoxy resin and a curing agent. and the other one is a curing agent. Preferably, the crystalline and non-crystalline substances have an average particle size of 10–150 μm, more preferably 20–100 μm.

When two or more non-crystalline substances are used, it is preferred that these substances be previously melt-blended with each other. Thus, these substances are melted and mixed with each other, and the mixture is cooled for solidification and pulverized. The pulverized mixture is then used as a raw material for the preparation of the powder coating composition.

When two or more crystalline substances are used, it is possible to use at least one (but not all) of the crystalline substances be used as such while using the other crystalline substance or substances as a melt-blended state with one or more non-crystalline substances. In this case, the crystalline substances are so selected that the glass transition point of the melt-blended mixture is lower than the melting point of at least one of the crystalline substances to be used as such. The glass transition temperature of the melt-blended mixture is lower than that of the non-crystalline substance (or those of the non-crystalline substances) before melt-blending.

By using the above melt-blended mixture, more homogeneous powder coating composition may be obtained.

Into the mixture of the crystalline and non-crystalline substances may be incorporated the curing accelerator, reactive organic solid and/or any other desired additives. The resulting mixture is then maintained at a temperature higher than the glass transition point Tg of the non-crystalline substance but lower than the melting point Mp of the crystalline substance.

The glass transition point Tg is a temperature at which the non-crystalline substance becomes sticky. By maintaining the mixture above the glass transition point Tg, therefore, the non-crystalline substance becomes sticky so that the non-crystalline substance is bonded or adhered to the crystalline substance particles. In this case, the bonding is performed at a temperature lower than the softening point of any of the non-crystalline substances.

The bonding may be performed at an ambient pressure or under a pressure. When ambient pressure is used, it is advisable to maintain the mixture at a temperature higher by at least 15° C. than the glass transition point Tg. In this case, the mixture may be previously pressed at a pressure of 0–30 Kg/cm² to make the mixture compact, if desired. The heating of the mixture may be effected by contacting a mass of the mixture, which may be in the form of a block, with a hot gas such as air or nitrogen. One preferred heating method includes placing the mixture on a belt conveyor to form a layer of the mixture with a thickness of 0.1–30 mm, preferably 1–5 mm, and passing the layer through a furnace. The heating time is generally 1–30 minutes, preferably 2–15 minutes.

When the bonding is carried out under a pressure, it is preferable to use a pressure of 50–300 kg/cm² This can be effected by means of heated pressure rolls or pressing plates. By carrying out the bonding under pressure, firm bonding of the crystalline and non-crystalline substances can be easily effected within a short period of time.

As a result of the maintenance of the mixture above the glass transition point Tg, the particles of the crystalline substance or substances and other additives are bonded with the non-crystalline substance serving as a binder.

The mixture heated to a temperature higher than Tg is then cooled to a temperature lower than Tg and solidified. When the heating is performed at ambient pressure, the solidified product is in the form of a porous plate with an apparent density of 0.3–0.5 g/cm³.

The solidified mixture is then pulverized and, if desired, sieved to form a powder coating composition having an average particle size of generally 50–1000 μm, preferably 60–800 μm. Since the non-crystalline substance or substances are firmly bonded to the crystalline substance or substances, they are not separated from each other during transportation storage or use. Further, since, in the preparation of the coating composition, the bonding step is performed at a temperature lower than the softening point of the non-crystalline substances, the method is energy saving and economical. Especially when the bonding is carried out under a pressure, the temperature may be further lowered so that it is possible to use an epoxy resin as the non-crystalline substance with the glass transition point Tg of as low as about 20° C. Such an epoxy resin has not been utilized as a raw material for the production of a powder coating composition for reasons of possible blocking of the composition. In addition, since the coating composition contains particles of crystalline substance, the coating composition shows a low viscosity when melted during the curing stage. The coating composition may be suitably utilized for the fluidized bed coating, electrostatic coating or spray coating of articles or as a powder vanish for impregnation.

The following examples will further illustrate the present invention. Parts are by weight.

EXAMPLE 1

A powder coating composition was prepared using the following ingredients each of which has been pulverized to a particle size of 2 mm or less:

| | |
|---|---|
| Crystalline epoxy resin (YX4000) *1 | 57.5 parts |
| Non-crystalline curing agent (OCN90) *2 | 23.5 parts |
| Curing accelerator (EPICURE P-200) *3 | 0.8 part |
| Reactive organic solid (BT-2170) *4 | 18.2 parts |

*1: Tetramethylbisphenol diglycidyl ether, Melting point: 105° C., manufactured by Yuka-Shell Epoxy Inc.
*2: o-Cresol novolak resin, Glass transition point: 40° C., Softening point: 90° C., manufactured by Nippon Kayaku K. K.
*3: Bisphenol A epoxy resin-adduct of imadazole, manufactured by Yuka-Shell Epoxy Inc.
*4: Bismaleimide-triazine resin, Glass transition point: 42° C., manufactured by Mitsubishi Gas Chemicals, Inc.

The three ingredients, OCN90, EPICURE P-200 and BT-2170, were mixed and extruded at a temperature of 100° C. for melt-blending. The extruded mixture in the form of a plate was cooled and pulverized to a particle size of 2 mm or less. The pulverized mixture had a glass transition point of 41° C. This mixture was then mixed blended with YX4000 and co-pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 2

A powder coating composition was prepared using the following ingredients each of which has been pulverized to a particle size of 2 mm or less:

| | |
|---|---|
| Crystalline epoxy resin (YX4000) *1 | 60.2 parts |
| Non-crystalline curing agent (OCN90) *2 | 38.0 parts |
| Curing accelerator (EPICURE P-200) *3 | 0.9 part |
| Leveling agent (NIKALITE XK-21) *6 | 0.3 part |
| Reactive organic solid (S-LEC BLS) *7 | 0.6 part |

*1–3: the same as above
*6: acrylate oligomer, manufactured by Nihon Carbide Inc.
*7: butyral resin, manufactured by Sekisui Kagaku K. K., Glass transition point: 120° C.

The four ingredients, OCN90, EPICURE P-200, NIKALITE XK-21 and S-LEC BLS, were mixed and extruded at a temperature of 110° C. for melt-blending. The extruded mixture in the form of a plate was cooled and pulverized to a particle size of 2 mm or less. The pulverized mixture had a glass transition point of 41° C. This mixture was then mixed blended with YX4000 and co-pulverized to obtain a pulverized blend which was able to pass through a 100 mesh sieve. The blend was then placed on a stainless plate to form a layer with a thickness of 2 mm. The stainless plate was heated to and maintained at 65° C. for 10 minutes and then cooled to room temperature to obtain a porous aggregate. The aggregate was pulverized and sieved to obtain a powder coating composition having a particle size of 20 mesh (Tyler) or less.

EXAMPLE 3

A powder coating composition was prepared using the following ingredients each of which has been pulverized to a particle size of 2 mm or less:

| | |
|---|---|
| Non-crystalline epoxy resin (EPIKOTE 1002) *8 crystalline epoxy resin | 29.6 parts |
| Crystalline curing agent (bisphenol A) *10 | 17.2 parts |
| Crystalline curing agent (EPIKURON B-4400) *11 | 4.1 parts |
| Curing accelerator (EPICURE P-200) *3 | 0.6 part |
| Reactive organic solid (MB-3000) *12 | 18.6 parts |

*3: the same as above
*8: bisphenol A diglycidyl ether, manufactured by Yuka-Shell Epoxy Inc., Epoxy equivalent: 650, Glass transition point: 42° C., Softening point: 83° C.)
*9: o-cresol novolak epoxy resin (EPIKOTE 180S65, manufactured by Yuka-Shell Epoxy Inc., Epoxy equivalent: 210, Glass transition point: 18° C. Softening point: 65° C.)
*10: Melting point: 157° C.
*11: 5-(2,5-dioxotetrahydrofroryl)-3-methyl-3-cyclohexene-1,2-dicarboxylic anhydride, manufactured by Dainihon Ink K. K., Melting point: 167° C.
*12: bismaleimide resin, manufactured by Mitsubishi Yuka K. K., Melting point: 156° C.

These ingredients were mixed with each other and the mixture was pulverized to obtain a pulverized blend which was able to pass through a 100 mesh sieve. The blend was then placed on a stainless plate to form a layer with a thickness of min. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 4

A powder coating composition was prepared using the following ingredients each of which has been pulverized to a particle size of 2 mm or less:

| | |
|---|---|
| Crystalline epoxy resin (YX4000) *1 | 33.8 parts |
| Non-crystalline epoxy resin (EPIKOTE 180S65) *9 | 11.3 parts |
| Crystalline curing agent (bisphenol A) *10 | 17.2 parts |
| Crystalline curing agent (EPIKURON B-4400) *11 | 4.1 parts |
| Curing accelerator (EPICURE P-200) *3 | 0.6 part |

-continued

| | |
|---|---|
| Reactive organic solid (MB-3000) *12 | 18.6 parts |

*1, 3: the same as above.
*8: bisphenol A diglycidyl ether, manufactured by Yuka Shell Epoxy Inc., Epoxy equivalent: 650, Glass transition point: 42° C., Softening point, 83° C.)
*10: Melting point: 157° C.
*11: 5-(2,5-dioxotetrahydrofroryl)-3-methyl-3-cyclohexene-1,2-dicarboxylic anhydride, manufactured by Dainihon Ink K. K., Melting point: 167° C.
*12: bismaleimide resin, manufactured by Mitsubishi Yuka K. K., Melting point: 156° C.

These ingredients were mixed with each other and the mixture was pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 4

A powder coating composition was prepared using the following ingredients each of which has been pulverized to a particle size of 2 mm or less:

| | |
|---|---|
| Crystalline epoxy resin (YX4000) *1 | 33.8 parts |
| Non-crystalline epoxy resin (EPIKOTE 180S65) *9 | 11.3 parts |
| Non-crystalline epoxy resin (EPIKOTE 1002) *8 | 11.3 parts |
| Crystalline curing agent (bisphenol A) *10 | 11.3 parts |
| Crystalline curing agent (EPIKURON B-4400) *11 | 5.6 parts |
| Non-crystalline epoxy resin (EPIKOTE 1002) *8 | 11.3 parts |
| Crystalline curing agent (bisphenol A) *10 | 11.3 parts |
| Crystalline curing agent (EPIKURON B-4400) *11 | 5.6 parts |
| Non-crystalline curing agent (OCN120) *5 | 11.8 parts |
| Reactive organic solid (THEIC) *13 | 14.1 parts |
| Curing accelerator (EPICURE P-200) *3 | 0.8 part |

*1, 3 and 8–11: the same as above
*5: o-Cresol novolak resin, Glass transition point: 70° C., Softening point: 120° C., manufactured by Nippon Kayaku K. K.
*13: tris(2-hydroxyethyl)isocyanurate, manufactured by Shikoku Kasei Inc., Melting point: 135° C.

These ingredients were mixed with each other and the mixture was pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 5

A powder coating composition was prepared using the following ingredients each of which has been pulverized to a particle size of 2 mm or less:

| | |
|---|---|
| Crystalline epoxy resin (YX4000) *1 | 39.0 parts |
| Non-crystalline epoxy resin (EPIKOTE 180S90) *14 | 13.0 parts |
| Non-crystalline epoxy resin (EPIKOTE 1002) *8 | 13.0 parts |
| Crystalline curing agent (bisphenol A) *10 | 13.0 parts |
| Crystalline curing agent (EPIKURON B-4400) *11 | 6.5 parts |
| Non-crystalline curing agent (OCN90) *2 | 13.6 parts |
| Non-crystalline curing agent (OCN120) *5 | 11.8 parts |

-continued

| | |
|---|---|
| Reactive organic solid (THEIC) *13 | 14.1 parts |
| Curing accelerator (EPICURE P-200) *3 | 0.8 part |

*1, 3 and 8–11: the same as above
*5: o-Cresol novolak resin, Glass transition point: 70° C., Softening point: 120° C., manufactured by Nippon Kayaku K. K.
*9: o-cresol novolak epoxy resin (EPIKOTE 180S65, manufactured by Yuka-Shell Epoxy Inc., Epoxy equivalent: 210, Glass transition point: 18° C. Softening point: 65° C.)
*13: tris(2-hydroxyethyl)isocyanurate, manufactured by Shikoku Kasei Inc., Melting point: 135° C.

These ingredients were mixed with each other and the mixture was pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 5

A powder coating composition was prepared using the following ingredients each of which has been pulverized to a particle size of 2 mm or less:

| | |
|---|---|
| Crystalline epoxy resin (YX4000) *1 | 39.0 parts |
| Non-crystalline epoxy resin (EPIKOTE 180S90) *14 | 13.0 parts |
| Non-crystalline epoxy resin (EPIKOTE 1002) *8 | 13.0 parts |
| Crystalline curing agent (bisphenol A) *10 | 13.0 parts |
| Crystalline curing agent (EPIKURON B-4400) *11 | 6.5 parts |
| Non-crystalline curing agent (OCN90) *2 | 13.6 parts |
| Curing accelerator (EPICURE P-200) *3 | 1.0 part |
| Leveling agent (NIKALITE XK-21) *6 | 0.3 part |
| Reactive organic solid (S-LEC BLS) *7 | 0.6 part |

*1–3 and 6–11: the same as above
*14: o-cresol novolak epoxy resin (EPIKOTE 180S90, manufactured by Yuka-Shell Epoxy Inc., Epoxy equivalent: 220, Glass transition point: 43° C. Softening point: 90° C.)

The six ingredients, bisphenol A, EPIKURON B-4400, OCN90, EPICURE P-200, NIKALITE XK-21 and S-LEC BLS, were mixed and extruded at a temperature of 120° C. for melt-blending. The extruded mixture in the form of a plate was cooled and pulverized to a particle size of 2 mm or less. This mixture was then mixed blended with EPIKOTE YX-4000, EPIKOTE 1002 and EPIKOTE 180S90 and co-pulverized to obtain a pulverized blend which was able to pass through a 100 mesh sieve. The blend was then placed on a stainless plate to form a layer with a thickness of 2 mm. The stainless plate was heated to and maintained at 65° C. for 10 minutes and then cooled to room temperature to obtain a porous aggregate. The aggregate was pulverized and sieved to obtain a powder coating composition having a particle size of 20 mesh (Tyler) or less.

Comparative Example 1

A powder coating composition was prepared using the following ingredients each of which has been pulverized to a particle size of 2 mm or less:

| | |
|---|---|
| Non-crystalline epoxy resin (EPIKOTE 180S65) *9 | 35.5 parts |
| Non-crystalline epoxy resin (EPIKOTE 1002) *8 | 35.5 parts |
| Non-crystalline curing agent (OCN120) *5 | 27.0 parts |
| Curing accelerator (EPICURE P-200) *3 | 1.1 part |

| -continued | |
|---|---|
| Leveling agent (NIKALITE XK-21) *6 | 0.4 part |
| Reactive organic solid (S-LEC BLS) *7 | 0.7 part |

*3 and 5–9: the same as above

The four ingredients other than EPIKOTE 1002 and EPIKOTE 180S65 were mixed and extruded at a temperature of 100° C. for melt-blending. The extruded mixture in the form of a plate was cooled and pulverized to a particle size of 2 mm or less. The pulverized mixture had a glass transition point of 76° C. This mixture was then mixed blended with the two epoxy resins, EPIKOTE 1002 and EPIKOTE 180S65 and co-pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

Comparative Example 2

A powder coating composition was prepared using the following ingredients each of which has been pulverized to a particle size of 2 mm or less:

| Crystalline epoxy resin (YX4000) *1 | 60.2 parts |
|---|---|
| Non-crystalline curing agent OCN90 *2 | 38.0 parts |
| Curing accelerator (EPICURE P-200) *3 | 0.9 part |
| Leveling agent (NIKALITE XK-21) *6 | 0.3 part |
| Reactive organic solid (S-LEC BLS) *7 | 0.6 part |

*1–3, and 6–7: the same as above

The five ingredients were mixed and extruded at a temperature of 60°–70° C. for 1 minute to effect melt-blending. The extruded mixture in the form of a plate was obtained. The plate when cooled to room temperature was so viscous that pulverization was unable to perform. Thus, the plate was cooled to −70° C. with liquid nitrogen and pulverized and sieved to obtain a powder coating composition having a particle size of 20 mesh (Tyler) or less.

Comparative Example 3

A powder coating composition was prepared using the following ingredients each of which has been pulverized to a particle size of 2 mm or less:

| Non-crystalline epoxy resin (EPIKOTE 180S65) *9 | 36.0 parts |
|---|---|
| Non-crystalline epoxy resin (EPIKOTE 1002) *8 | 36.0 parts |
| Crystalline curing agent (bisphenol A) *10 | 20.9 parts |
| Crystalline curing agent (EPIKURON B-4400) *11 | 5.0 parts |
| Non-crystalline curing agent (OCN120) *5 | 13.6 parts |
| Curing accelerator (EPICURE P-200) *3 | 1.1 part |
| Leveling agent (NIKALITE XK-21) *6 | 0.4 part |
| Reactive organic solid (S-LEC BLS) *7 | 0.7 part |

*3 and 5–11: the same as above

These ingredients were mixed and extruded at a temperature of 90°–100° C. for 1 minute to effect melt-blending. The extruded mixture in the form of a plate was cooled to about 5° C. and pulverized and sieved to obtain a powder coating composition having a particle size of 20 mesh (Tyler) or less.

Comparative Example 4

A powder coating composition was prepared using the following ingredients each of which has been pulverized to a particle size of 2 mm or less:

| Crystalline epoxy resin (YX4000) *1 | 39.0 parts |
|---|---|
| Non-crystalline epoxy resin (EPIKOTE 180S65) *9 | 13.0 parts |
| Non-crystalline epoxy resin (EPIKOTE 1002) *8 | 13.0 parts |
| Crystalline curing agent (bisphenol A) *10 | 13.0 parts |
| Crystalline curing agent (EPIKURON B-4400) *11 | 6.5 parts |
| Non-crystalline curing agent (OCN90) *2 | 13.6 parts |
| Curing accelerator (EPICURE P-200) *3 | 1.0 part |
| Leveling agent (NIKALITE XK-21) *6 | 0.3 part |
| Reactive organic solid (S-LEC BLS) *7 | 0.6 part |

*1–3 and 6–11: the same as above

These ingredients were mixed and extruded at a temperature of 70° C. for 1 minute to effect melt-blending. The extruded mixture in the form of a plate was cooled to about −70° C. and pulverized and sieved to obtain a powder coating composition having a particle size of 20 mesh (Tyler) or less.

Comparative Example 5

Comparative Example 4 was repeated in the same manner as described except that the melt-blending was carried out at a temperature of 90°–100° C.

The powder coating compositions obtained in the above Examples and Comparative Examples were tested for their gelling time, flow rate, anti-blocking property and uniformity as well as glass transition point and adhesion strength of the cured product of each of them. The results are summarized in Table 1. The test methods are as follows.

Gelling Time:

In accordance with JIS C-2104, the time required for a sample composition to gel at a temperature of 150° C. is measured.

Flow rate:

A sample composition (0.5 g) is formed into a tablet with a diameter of 13 mm. The tablet is placed on an iron plate preheated to 150° C. and inclined at an angle of 10° and heated at 150° C. for 20 minutes to permit the tablet to melt and flow. The distance (L) through which the melted composition flowed is measured. Flow rate is defined as follows:

Flow rate=(L−13)/D wherein L is the length (mm) of the melt-flowed sample and D is the thickness (mm) of the tablet. A flow rate of 20 or more is regarded as being good.

Anti-Blocking Property:

A sample composition (50 g) is placed in a cup and is allowed to stand at 40° C. for 3 hours. Anti-blocking property is evaluated as follows:

A: good: no lumps are observed
B: not good: lumps are formed but are easily broken with fingers
C: bad: hard lumps are formed Uniformity:

In accordance with JIS C-2104, variation of gelling time with particle size distribution is evaluated. Samples (1)(3) with the following three different particle distribution are prepared.
(1) 60 mesh or finer
(2) finer than 20 mesh but not finer than 40 mesh
(3) not finer than 20 mesh Each sample is measured for its gelling time. Uniformity is rated as follows:
 A: good: difference in gelling time among (1)–(3) is within 2 seconds
 B: not good: difference in gelling time is 2–5 seconds
 C: bad: difference in gelling time is more than 5 seconds Glass Transition Point:

A sample composition is cured at 180° C. for 30 minutes. Glass transition point of the cured sample is measured by means of thermomechanical analyzer (TMA). A glass transition point of 140° C. or more is regarded as being good.

Adhesion Strength in Shear:

In accordance with JIS K6850, two steel plates (25×100 mm) are bonded with sample composition (overlap length: 12.5 mm) at 180° C. for 30 minutes. The two plates are drawn in opposite direction to measure the adhesion strength.

TABLE 1

|  | Gelling Time | Flow-Rate | Uni-formity | Tg (°C.) | Adhesion Strength (kg/cm$^2$) | Anti-Blocking Property |
|---|---|---|---|---|---|---|
| Ex. 1 | 142 | 45 | good | 170 | 180 | good |
| Ex. 2 | 138 | 50 | good | 160 | 185 | good |
| Ex. 3 | 145 | 40 | good | 160 | 200 | good |
| Ex. 4 | 148 | 48 | good | 155 | 195 | good |
| Ex. 5 | 125 | 30 | good | 160 | 208 | good |
| Comp. 1 | 115 | 8 | good | 150 | 153 | bad |
| Comp. 2 | 140 | 48 | no good | 153 | 158 | bad |
| Comp. 3 | 132 | 15 | good | 148 | 215 | bad |
| Comp. 4 | 133 | 35 | good | 155 | 210 | bad |
| Comp. 5 | 138 | 35 | good | 156 | 205 | bad |

EXAMPLES 6

A powder coating composition was prepared using the following ingredients each of which has been pulverized to a particle size of 2 mm or less:

| | |
|---|---|
| Crystalline epoxy resin (YX4000) *1 | 60.0 parts |
| Non-crystalline epoxy resin (EPIKOTE 180S90) *14 | 20.0 parts |
| Non-crystalline epoxy resin (EPIKOTE 1002) *8 | 20.0 parts |
| Crystalline curing agent (bisphenol A) *10 | 20.0 parts |
| Crystalline curing agent (EPIKURON B-4400) *11 | 10.0 parts |
| Non-crystalline curing agent (OCN120) *5 | 21.0 parts |
| Curing accelerator (EPICURE P-200) *3 | 1.5 part |

*1, 3, 5, 8, 10 and 11: the same as above
*14: o-cresol novolak epoxy resin (EPIKOTE 180S90, manufactured by Yuka-Shell Epoxy Inc., Epoxy equivalent: 220, Glass transition point: 43° C. Softening point: 90° C.)

These ingredients were mixed and co-pulverized to obtain a powder which was able to pass through a 120 mesh sieve. The powder was then pressed at a temperature of 45° C. and a pressure of 100 g/cm$^2$ will a roll compacter and the resulting compressed mass was pulverized and sieved to obtain a powder coating composition having a particle size of 20 mesh or finer.

EXAMPLE 7

Example 6 was repeated in the same manner as described except that the compression was performed at 55° C. and that the following ingredients were used for the formation of powder coating composition:

| | |
|---|---|
| Crystalline epoxy resin (YX4000) *1 | 90.0 parts |
| Non-crystalline epoxy resin (EPIKOTE 1004) *15 | 10.0 parts |
| Crystalline curing agent (bisphenol A) *10 | 20.0 parts |
| Crystalline curing agent (EPIKURON B-4400) *11 | 11.0 parts |
| Non-crystalline curing agent (OCN120) *5 | 21.0 parts |
| Curing accelerator (EPICURE P-200) *3 | 1.5 parts |
| Additive (RIKAFLOW) *16 | 1.0 part |

*1, 3, 5, 10 and 11: the same as above
*15: bisphenol A diglycidyl ether, manufactured by Yuka-Shell Epoxy Inc., Epoxy equivalent: 950, Glass transition point: 53° C., Softening point: 98° C.)
*16: Di-octadecyl-4,5-epoxy-hexahydrophthalate (manufactured by Shin-Nihon Rika K. K.)

EXAMPLE 8

Example 6 was repeated in the same manner as described except that the following ingredients were used for the formation of powder coating composition:

| | |
|---|---|
| Crystalline epoxy resin (YX4000) *1 | 60.0 parts |
| Non-crystalline epoxy resin (EPIKOTE 180S65) *9 | 20.0 parts |
| Non-crystalline epoxy resin (EPIKOTE 1002) *8 | 20.0 parts |
| Crystalline curing agent (bisphenol A) *10 | 38.0 parts |
| Crystalline curing agent (EPIKURON B-4400) *11 | 13.0 parts |
| Curing accelerator (EPICURE P-200) *3 | 1.5 part |

*1, 3, 8–11: the same as above

EXAMPLE 9

Example 6 was repeated in the same manner as described except that the following ingredients were used for the formation of powder coating composition:

| | |
|---|---|
| Crystalline epoxy resin (YX4000) *1 | 80.0 parts |
| Non-crystalline epoxy resin (EPIKOTE 1004) *14 | 20.0 parts |
| Crystalline curing agent (bisphenol A) *10 | 28.0 parts |
| Crystalline curing agent (TMA) *17 | 15.0 parts |
| Non-crystalline curing agent (OCN90) *2 | 10.0 parts |
| Curing accelerator (EPICURE P-200) *3 | 1.5 parts |

*1–3, 10 and 14: the same as above
*17: Trimellitic anhydride (Melting point 167° C.)

The powder coating compositions obtained in Examples 6–9 were then tested for their anti-blocking property, adhesion strength in shear and flow rate in the same manner as described above. Also tested was the stability of each of the compositions. Thus, sample composition was maintained at 40° C. under a relative humidity of 70% for 7 days. Then, the flow rate was measured in the manner described previously. Stability is expressed by $FL_1/FL_0 \times 100$ (%) wherein $FL_1$ and $FL_0$ are flow rates of the sample after and before the test, respectively. The results are summarized in Table 2.

TABLE 2

|  | Adhesion Strength (kg/cm$^2$) | Anti-Blocking Property | Flow Rate | Stability (%) |
|---|---|---|---|---|
| Example 6 | 208 | good | 27.1 | 82 |
| Example 7 | 220 | good | 37.0 | 93 |
| Example 8 | 203 | good | 44.0 | 84 |
| Example 9 | 297 | good | 30.1 | 81 |

What is claimed is:

1. A powder coating composition comprising:
 one or more crystalline substances, one of which is a particulate ingredient (a) having a melting point Mp which is lower than those of the other crystalline substances, and one or more non-crystalline substances, one of which is a particulate ingredient (b) having a glass transition point Tg which is lower than those of the other non-crystalline substances and which is lower than said melting point Mp, wherein said crystalline and non-crystalline substances both include a combination of an epoxy resin and 0.7–1.5 equivalents of a curing agent per equivalent of epoxy groups in said epoxy resin and wherein said crystalline and non-crystalline substances have been maintained at a temperature which is higher than said glass transition point Tg of said ingredient (b) but lower than said melting point Mp of said ingredient (a) and which is lower than any softening point of said one or more non-crystalline substances so that the particles of said crystalline and non-crystalline substances are bonded with each other with said ingredient (b) serving as a binder, wherein the total amount of said one or more non-crystalline substances is in the range of 20 to 60 parts by weight per 100 parts by weight of the total of said one or more crystalline substances, wherein non-crystalline epoxy resin is 5–25% by weight of the total of said epoxy resin and wherein the crystalline curing agent is 58.8–81.1% by weight of the total of said curing agent.

2. A composition according to claim 1, wherein the amount of said ingredient (b) is at least 10% by weight based on the total amount of said one or more non-crystalline substances.

3. A composition according to claim 1, wherein said glass transition point Tg is in the range of 15°–75° C.

4. A composition according to claim 1, further comprising an organic solid material which is reactive with the epoxy resin or resins and which is selected from the group consisting of bismaleimide resins, bismaleimide-triazine resins, butyral resins and polyols.

5. A composition according to claim 1, further comprising a curing accelerator.

6. A composition according to claim 1 wherein the crystalline epoxy resin is at least one member selected from the group consisting of triglycidyl isocyanurate, epoxypropoxydimethylbenzylacrylamide, hydroquinone diglycidyl ether, bisphenol S diglycidyl ether, tetramethylbisphenol diglycidyl ether, 2,5-di-t-butylhydroquinone diglycidyl ether and terephthalic acid diglycidyl ester.

7. A composition according to claim 1 wherein the crystalline curing agent is at least one member selected from the group consisting of 5-(2,5-dioxotetrahydrofroryl)-3-methyl-3-cyclohexene-1,2-dicarboxylic anhydride, tetrahydrophthalic anhydride, bisphenol A, bisphenol S, organic acid hydrizides, and dicyanodiamide.

8. A composition according to claim 1 wherein the non-crystalline epoxy resin is at least one member selected from the group consisting of bisphenol A diglycidyl ether and o-cresol novolak epoxy resin.

9. A composition according to claim 1 wherein the non-crystalline curing agent is at least one member selected from the group consisting of phenol novolak resin and o-cresol novolak resin.

10. A composition according to claim 1 wherein the crystalline epoxy resin is at least one member selected from the group consisting of triglycidyl isocyanurate, epoxypropoxydimethylbenzylacrylamide, hydroquinone diglycidyl ether, bisphenol S diglycidyl ether, tetramethylbisphenol diglycidyl ether, 2,5-di-t-butylhydroquinone diglycidyl ether and terephthalic acid diglycidyl ester;

wherein the crystalline curing agent is at least one member selected from the group consisting of 5-(2,5-dioxotetrahydrofroryl)-3-methyl- 3-cyclohexene-1,2-dicarboxylic anhydride, tetrahydrophthalic anhydride, bisphenol A, bisphenol S, organic acid hydrizides, and dicyanodiamide;

wherein the non-crystalline epoxy resin is at least one member selected from the group consisting of bisphenol A diglycidyl ether and o-cresol novolak epoxy resin; and wherein the non-crystalline curing agent is at least one member selected from the group consisting of phenol novolak resin and o-cresol novolak resin.

11. A composition according to claim 1 wherein the total amount of said one or more non-crystalline substances is in the range of 20 to 50 parts by weight per 100 parts by weight of the total of said one or more crystalline substances.

12. A process for the preparation of a powder coating composition, comprising the steps of:
(a) providing a mixture containing one or more crystalline substances one of which has a melting point Mp which is lower than those of the other crystalline substances, and one or more non-crystalline substances one of which has a glass transition point Tg which is lower than those of the other non-crystalline substances and which is lower than said melting point Mp, wherein said crystalline and non-crystalline substances are selected from epoxy resins and curing agents and include a combination of an epoxy resin and a curing agent;
(b) maintaining said mixture at a temperature which is higher than said glass transition point Tg but lower than said melting point Mp and which is lower than any softening point of said one or more non-crystalline substances so that said crystalline substances and non-crystalline substances are bonded with each other with said non-crystalline substance having the glass transition point Tg serving as a binder;
(c) then cooling the mixture obtained in step (b) to a temperature lower than said glass transition point Tg; and
(d) then pulverizing the cooled mixture obtained in step (c).

13. A process according to claim 12, wherein said step (b) is performed at an ambient pressure and at a temperature higher by at least 15° C. than said glass transition point Tg.

14. A process according to claim 12, wherein said step (b) is performed while pressing said mixture at a pressure of 50–300 kg/cm².

15. A process according to claim 14, wherein said melting point Mp is at least 90° C. and said one or more non-crystalline substances have a softening point of at least 50° C.

16. A process according to claim 15, wherein said non-crystalline substance having the glass transition point Tg is an epoxy resin and said Tg is in the range of 15°–75° C.

17. A process according to claim 12, wherein the total amount of said one or more non-crystalline substances is in the range of 15 to 70 parts by weight per 100 parts by weight of the total of said one or more crystalline substances.

18. A process according to claim 12, wherein the amount of said non-crystalline substance having the glass transition point Tg is at least 10% by weight based on the total amount of said one or more non-crystalline substances.

* * * * *

UNITED STATES PATENT AND TRADEMARK OFFICE
CERTIFICATE OF CORRECTION

PATENT NO. : 5,414,058
DATED : May 9, 1995
INVENTOR(S) : Ono, et al

It is certified that error appears in the above-identified patent and that said Letters Patent is hereby corrected as shown below:

Columns 7-16, should be deleted to be replaced with the attached pages.

Signed and Sealed this

Seventh Day of May, 1996

Attest:

BRUCE LEHMAN

Attesting Officer

Commissioner of Patents and Trademarks

The solidified mixture is then pulverized and, if desired, sieved to form a powder coating composition having an average particle size of generally 50–1000 μm, preferably 60–800 μm. Since the non-crystalline substance or substance are firmly bonded to the crystalline substance or substances, they are not separated from each other during transportation storage or use. Further, since, in the preparation of the coating composition, the bonding step is performed at a temperature lower than the softening point of the non-crystalline substances, the method is energy saving and economical. Especially when the bonding is carried out under a pressure, the temperature may be further lowered so that it is possible to use an epoxy resin as the non-crystalline substance with the glass transition point Tg of as low as about 20° C. Such an epoxy resin has not been utilized as a raw material for the production of a powder coating composition for reasons of possible blocking of the composition. In addition, since the coating composition contains particles of crystalline substance, the coating composition shows a low viscosity when melted during the curing stage. The coating composition may be suitably utilized for the fluidized bed coating, electrostatic coating or spray coating of articles or as a powder vanish for impregnation.

The following examples will further illustrate the present invention. Parts are by weight.

EXAMPLE 1

A powder coating composition was prepared using the following ingredients each of which has been pulverized to a particle size of 2 mm or less:

| | |
|---|---|
| Crystalline epoxy resin (YX4000) *1 | 57.5 parts |
| Non-crystalline curing agent (OCN90) *2 | 23.5 parts |
| Curing accelerator (EPICURE P-200) *3 | 0.8 part |
| Reactive organic solid (BT-2170) *4 | 18.2 parts |

*1: Tetramethylbisphenol diglycidyl ether, Melting point: 105° C., manufactured by Yuka-Shell Epoxy Inc.
*2: o-Cresol novolak resin, Glass transition point: 40° C., Softening point: 90° C. manufactured by Nippon Kayaku K. K.
*3: Bisphenol A epoxy resin-adduct of imadazole, manufactured by Yuka-Shell Epoxy Inc.
*4: Bismaleimide-triazine resin, Glass transition point: 42° C., manufactured by Mitsubishi Gas Chemicals, Inc.

The three ingredients, OCN90, EPICURE P-200 and BT-2170, were mixed and extruded at a temperature of 100° C. for melt-blending. The extruded mixture in the form of a plate was cooled and pulverized to a particle size of 2 mm or less. The pulverized mixture had a glass transition point of 41° C. This mixture was then mixed blended with YX4000 and co-pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 2

A powder coating composition was prepared using the following ingredients each of which has been pulverized to a particle size of 2 mm or less:

| | |
|---|---|
| Crystalline epoxy resin (YX4000) *1 | 60.2 parts |
| Non-crystalline curing agent (OCN90) *2 | 38.0 parts |
| Curing accelerator (EPICURE P-200) *3 | 0.9 part |
| Leveling agent (NIKALITE XK-21) *6 | 0.3 part |
| Reactive organic solid (S-LEC BLS) *7 | 0.6 part |

*1–3: the same as above
*6: acrylate oligomer, manufactured by Nihon Carbide Inc.
*7: butyral resin, manufactured by Sekisui Kagaku K. K., Glass transition point: 120° C.

The four ingredients, OCN90, EPICURE P-200, NIKALITE XK-21 and S-LEC BLS, were mixed and extruded at a temperature of 110° C. for melt-blending. The extruded mixture in the form of a plate was cooled and pulverized to a particle size of 2 mm or less. The pulverized mixture had a glass transition point of 41° C. This mixture was then mixed blended with YX4000 and co-pulverized to obtain a pulverized blend which was able to pass through a 100 mesh sieve. The blend was then placed on a stainless plate to form a layer with a thickness of 2 mm. The stainless plate was heated to and maintained at 65° C. for 10 minutes and then cooled to room temperature to obtain a porous aggregate. The aggregate was pulverized and sieved to obtain a powder coating composition having a particle size of 20 mesh (Tyler) or less.

EXAMPLE 3

A powder coating composition was prepared using the following ingredients each of which has been pulverized to a particle size of 2 mm or less:

| | |
|---|---|
| Non-crystalline epoxy resin (EPIKOTE 1002) *8 | 29.6 parts |
| Crystalline epoxy resin (YX4000) *1 | |
| Crystalline curing agent (bisphenol A) *10 | 17.2 parts |
| Crystalline curing agent (EPIKURON B-4400) *11 | 4.1 parts |
| Curing accelerator (EPICURE P-200) *3 | 0.6 part |
| Reactive organic solid (MB-3000) *12 | 18.6 parts |

*1, 3: the same as above.
*8: bisphenol A diglycidyl ether, manufactured by Yuka Shell Epoxy Inc., Epoxy equivalent: 690, Glass transition point: 42° C., Softening point, 83° C.)
*10: Melting point: 157° C.
*11: 5-(2,5-dioxotetrahydrofroryl)-3-methyl-3-cyclohexene-1,2-dicarboxylic anhydride, manufactured by Dainihon Ink K. K., Melting point: 167° C.
*12: bismaleimide resin, manufactured by Mitsubishi Yuka K. K., Melting point: 156° C.

These ingredients were mixed with each other and the mixture was pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 4

A powder coating composition was prepared using the following ingredients each of which has been pulverized to a particle size of 2 mm or less:

| | |
|---|---|
| Crystalline epoxy resin (YX4000) *1 | 33.8 parts |
| Non-crystalline epoxy resin (EPIKOTE 180S65) *9 | 11.3 parts |
| Non-crystalline epoxy resin (EPIKOTE 1002) *8 | 11.3 parts |
| Crystalline curing agent (bisphenol A) *10 | 11.3 parts |

-continued

| | |
|---|---|
| Crystalline curing agent (EPIKURON B-4400) *11 | 5.6 parts |
| Non-crystalline curing agent (OCN120) *5 | 11.8 parts |
| Reactive organic solid (THEIC) *13 | 14.1 parts |
| Curing accelerator (EPICURE P-200) *3 | 0.8 part |

*1, 3 and 8–11: the same as above
*5: o-Cresol novolak resin, Glass transition point: 70° C., Softening point: 120° C., manufactured by Nippon Kayaku K. K.
*9: o-cresol novolak epoxy resin (EPIKOTE 180S65, manufactured by Yuka-Shell Epoxy Inc., Epoxy equivalent: 210. Glass transition point: 18° C. Softening point: 65° C.)
*13: tris(2-hydroxyethyl)isocyanurate, manufactured by Shikoku Kasei Inc., Melting point: 135° C.

These ingredients were mixed with each other and the mixture was pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

EXAMPLE 5

A powder coating composition was prepared using the following ingredients each of which has been pulverized to a particle size of 2 mm or less:

| | |
|---|---|
| Crystalline epoxy resin (YX4000) *1 | 39.0 parts |
| Non-crystalline epoxy resin (EPIKOTE 180S90) *14 | 13.0 parts |
| Non-crystalline epoxy resin (EPIKOTE 1002) *8 | 13.0 parts |
| Crystalline curing agent (bisphenol A) *10 | 13.0 parts |
| Crystalline curing agent (EPIKURON B-4400) *11 | 6.5 parts |
| Non-crystalline curing agent (OCN90) *2 | 13.6 parts |
| Curing accelerator (EPICURE P-200) *3 | 1.0 part |
| Leveling agent (NIKALITE XK-21) *6 | 0.3 part |
| Reactive organic solid (S-LEC BLS) *7 | 0.6 part |

*1–3 and 6–11: the same as above
*14: o-cresol novolak epoxy resin (EPIKOTE 180S90, manufactured by Yuka-Shell Epoxy Inc., Epoxy equivalent: 220. Glass transition point: 43° C. Softening point: 90° C.)

The six ingredients, bisphenol A, EPIKURON B-4400, OCN90, EPICURE P-200, NIKALITE XK-21 and S-LEC BLS, were mixed and extruded at a temperature of 120° C. for melt-blending. The extruded mixture in the form of a plate was cooled and pulverized to a particle size of 2 mm or less. This mixture was then mixed blended with EPIKOTE YX-4000, EPIKOTE 1002 and EPIKOTE 180S90 and co-pulverized to obtain a pulverized blend which was able to pass through a 100 mesh sieve. The blend was then placed on a stainless plate to form a layer with a thickness of 2 mm. The stainless plate was heated to and maintained at 65° C. for 10 minutes and then cooled to room temperature to obtain a porous aggregate. The aggregate was pulverized and sieved to obtain a powder coating composition having a particle size of 20 mesh (Tyler) or less.

Comparative Example 1

A powder coating composition was prepared using the following ingredients each of which has been pulverized to a particle size of 2 mm or less:

| | |
|---|---|
| Non-crystalline epoxy resin | 35.5 parts |

-continued

| | |
|---|---|
| (EPIKOTE 180S65) *9 | |
| Non-crystalline epoxy resin (EPIKOTE 1002) *8 | 35.5 parts |
| Non-crystalline curing agent (OCN120) *5 | 27.0 parts |
| Curing accelerator (EPICURE P-200) *3 | 1.1 part |
| Leveling agent (NIKALITE XK-21) *6 | 0.4 part |
| Reactive organic solid (S-LEC BLS) *7 | 0.7 part |

*3 and 5–9: the same as above

The four ingredients other than EPIKOTE 1002 and EPIKOTE 180S65 were mixed and extruded at a temperature of 100° C. for melt-blending. The extruded mixture in the form of a plate was cooled and pulverized to a particle size of 2 mm or less. The pulverized mixture had a glass transition point of 76° C. This mixture was then mixed blended with the two epoxy resins, EPIKOTE 1002 and EPIKOTE 180S65 and co-pulverized to obtain a pulverized blend which was able to pass through a 100 mesh sieve. The blend was then placed on a stainless plate to form a layer with a thickness of 2 mm. The stainless plate was heated to and maintained at 60° C. for 10 minutes and then cooled to room temperature to obtain a porous aggregate. The aggregate was pulverized and sieved to obtain a powder coating composition having a particle size of 20 mesh (Tyler) or less.

Comparative Example 2

A powder coating composition was prepared using the following ingredients each of which has been pulverized to a particle size of 2 mm or less:

| | |
|---|---|
| Crystalline epoxy resin (YX4000) *1 | 60.2 parts |
| Non-crystalline curing agent OCN90 *2 | 38.0 parts |
| Curing accelerator (EPICURE P-200) *3 | 0.9 part |
| Leveling agent (NIKALITE XK-21) *6 | 0.3 part |
| Reactive organic solid (S-LEC BLS) *7 | 0.6 part |

*1–3, and 6–7: the same as above

The five ingredients were mixed and extruded at a temperature of 60°–70° C. for 1 minute to effect melt-blending. The extruded mixture in the form of a plate was obtained. The plate when cooled to room temperature was so viscous that pulverization was unable to perform. Thus, the plate was cooled to −70° C. with liquid nitrogen and pulverized and sieved to obtain a powder coating composition having a particle size of 20 mesh (Tyler) or less.

Comparative Example 3

A powder coating composition was prepared using the following ingredients each of which has been pulverized to a particle size of 2 mm or less:

| | |
|---|---|
| Non-crystalline epoxy resin (EPIKOTE 180S65) *9 | 36.0 parts |
| Non-crystalline epoxy resin (EPIKOTE 1002) *8 | 36.0 parts |
| Crystalline curing agent (bisphenol A) *10 | 20.9 parts |
| Crystalline curing agent (EPIKURON B-4400) *11 | 5.0 parts |
| Non-crystalline curing agent (OCN120) *5 | 13.6 parts |
| Curing accelerator (EPICURE P-200) *3 | 1.1 part |
| Leveling agent (NIKALITE XK-21) *6 | 0.4 part |
| Reactive organic solid (S-LEC BLS) *7 | 0.7 part |

*3 and 5–11: the same as above

These ingredients were mixed and extruded at a temperature of 90°–100° C. for 1 minute to effect melt-blending. The extruded mixture in the form of a plate was cooled to about 5° C. and pulverized and sieved to obtain a powder coating composition having a particle size of 20 mesh (Tyler) or less.

Comparative Example 4

A powder coating composition was prepared using the following ingredients each of which has been pulverized to a particle size of 2 mm or less:

| | |
|---|---|
| Crystalline epoxy resin (YX4000) *1 | 39.0 parts |
| Non-crystalline epoxy resin (EPIKOTE 180S65) *9 | 13.0 parts |
| Non-crystalline epoxy resin (EPIKOTE 1002) *8 | 13.0 parts |
| Crystalline curing agent (bisphenol A) *10 | 13.0 parts |
| Crystalline curing agent (EPIKURON B-4400) *11 | 6.5 parts |
| Non-crystalline curing agent (OCN90) *2 | 13.6 parts |
| Curing accelerator (EPICURE P-200) *3 | 1.0 part |
| Leveling agent (NIKALITE XK-21) *6 | 0.3 part |
| Reactive organic solid (S-LEC BLS) *7 | 0.6 part |

*1–3 and 6–11: the same as above

These ingredients were mixed and extruded at a temperature of 70° C. for 1 minute to effect melt-blending. The extruded mixture in the form of a plate was cooled to about −70° C. and pulverized and sieved to obtain a powder coating composition having a particle size of 20 mesh (Tyler) or less.

Comparative Example 5

Comparative Example 4 was repeated in the same manner as described except that the melt-blending was carried out at a temperature of 90°–100° C.

The powder coating compositions obtained in the above Examples and Comparative Examples were tested for their gelling time, flow rate, anti-blocking property and uniformity as well as glass transition point and adhesion strength of the cured product of each of them. The results are summarized in Table 1. The test methods are as follows.

Gelling Time:
In accordance with JIS C-2104, the time required for a sample composition to gel at a temperature of 150° C. is measured.

Flow rate:
A sample composition (0.5 g) is formed into a tablet with a diameter of 13 mm. The tablet is placed on an iron plate preheated to 150° C. and inclined at an angle of 10° and heated at 150° C. for 20 minutes to permit the tablet to melt and flow. The distance (L) through which the melted composition flowed is measured. Flow rate is defined as follows:

Flow rate=(L−13)/D wherein L is the length (mm) of the melt-flowed sample and D is the thickness (mm) of the tablet. A flow rate of 20 or more is regarded as being good.

Anti-Blocking Property:
A sample composition (50 g) is placed in a cup and is allowed to stand at 40° C. for 3 hours. Anti-blocking property is evaluated as follows:
A: good: no lumps are observed
B: not good: lumps are formed but are easily broken with fingers
C: bad: hard lumps are formed Uniformity:
In accordance with JIS C-2104, variation of gelling time with particle size distribution is evaluated. Samples (1)(3) with the following three different particle distribution are prepared.

(1) 60 mesh or finer
(2) finer than 20 mesh but not finer than 40 mesh
(3) not finer than 20 mesh Each sample is measured for its gelling time. Uniformity is rated as follows:
A: good: difference in gelling time among (1)–(3) is within 2 seconds
B: not good: difference in gelling time is 2–5 seconds
C: bad: difference in gelling time is more than 5 seconds Glass Transition Point:
A sample composition is cured at 180° C. for 30 minutes. Glass transition point of the cured sample is measured by means of thermomechanical analyzer (TMA). A glass transition point of 140° C. or more is regarded as being good.

Adhesion Strength in Shear:
In accordance with JIS K6850, two steel plates (25×100 mm) are bonded with sample composition (overlap length: 12.5 mm) at 180° C. for 30 minutes. The two plates are drawn in opposite direction to measure the adhesion strength.

TABLE 1

| | Gelling Time | Flow-Rate | Uniformity | Tg (°C.) | Adhesion Strength (kg/cm²) | Anti-Blocking Property |
|---|---|---|---|---|---|---|
| Ex. 1 | 142 | 45 | good | 170 | 180 | good |
| Ex. 2 | 138 | 50 | good | 160 | 185 | good |
| Ex. 3 | 145 | 40 | good | 160 | 200 | good |
| Ex. 4 | 148 | 48 | good | 155 | 195 | good |
| Ex. 5 | 125 | 30 | good | 160 | 208 | good |
| Comp. 1 | 115 | 8 | good | 150 | 153 | bad |
| Comp. 2 | 140 | 48 | no good | 153 | 158 | bad |
| Comp. 3 | 132 | 15 | good | 148 | 215 | bad |
| Comp. 4 | 133 | 35 | good | 155 | 210 | bad |
| Comp. 5 | 138 | 35 | good | 156 | 205 | bad |

EXAMPLES 6

A powder coating composition was prepared using the following ingredients each of which has been pulverized to a particle size of 2 mm or less:

| | |
|---|---|
| Crystalline epoxy resin (YX4000) *1 | 60.0 parts |
| Non-crystalline epoxy resin (EPIKOTE 180S90) *14 | 20.0 parts |
| Non-crystalline epoxy resin (EPIKOTE 1002) *8 | 20.0 parts |
| Crystalline curing agent (bisphenol A) *10 | 20.0 parts |
| Crystalline curing agent (EPIKURON B-4400) *11 | 10.0 parts |
| Non-crystalline curing agent (OCN120) *5 | 21.0 parts |
| Curing accelerator (EPICURE P-200) *3 | 1.5 part |

*1, 3, 5, 8, 10 and 11: the same as above
*14: o-cresol novolak epoxy resin (EPIKOTE 180S90, manufactured by Yuka-Shell Epoxy Inc., Epoxy equivalent: 220, Glass transition point: 43° C. Softening point: 90° C.)

These ingredients were mixed and co-pulverized to obtain a powder which was able to pass through a 120 mesh sieve. The powder was then pressed at a temperature of 45° C. and a pressure of 100 g/cm² with a roll compacter and the resulting compressed mass was pulverized and sieved to obtain a powder coating composition having a particle size of 20 mesh or finer.

EXAMPLE 7

Example 6 was repeated in the same manner as described except that the compression was performed at 55° C. and that the following ingredients were used for the formation of powder coating composition:

| | |
|---|---|
| Crystalline epoxy resin (YX4000) *1 | 90.0 parts |
| Non-crystalline epoxy resin (EPIKOTE 1004) *15 | 10.0 parts |
| Crystalline curing agent (bisphenol A) *10 | 20.0 parts |
| Crystalline curing agent (EPIKURON B-4400) *11 | 11.0 parts |
| Non-crystalline curing agent (OCN120) *5 | 21.0 parts |
| Curing accelerator (EPICURE P-200) *3 | 1.5 parts |
| Additive (RIKAFLOW) *16 | 1.0 part |

*1, 3, 5, 10 and 11: the same as above
*15: bisphenol A diglycidyl ether, manufactured by Yuka-Shell Epoxy Inc., Epoxy equivalent: 950, Glass transition point: 53° C., Softening point: 98° C.)
*16: Di-octadecyl-4,5-epoxy-hexahydrophthalate (manufactured by Shin-Nihon Rika K. K.)

EXAMPLE 8

Example 6 was repeated in the same manner as described except that the following ingredients were used for the formation of powder coating composition:

| | |
|---|---|
| Crystalline epoxy resin (YX4000) *1 | 60.0 parts |
| Non-crystalline epoxy resin (EPIKOTE 180S65) *9 | 20.0 parts |
| Non-crystalline epoxy resin (EPIKOTE 1002) *8 | 20.0 parts |
| Crystalline curing agent (bisphenol A) *10 | 38.0 parts |
| Crystalline curing agent (EPIKURON B-4400) *11 | 13.0 parts |
| Curing accelerator (EPICURE P-200) *3 | 1.5 part |

*1, 3, 8–11: the same as above

EXAMPLE 9

Example 6 was repeated in the same manner as described except that the following ingredients were used for the formation of powder coating composition:

| | |
|---|---|
| Crystalline epoxy resin (YX4000) *1 | 80.0 parts |
| Non-crystalline epoxy resin (EPIKOTE 1004) *14 | 20.0 parts |
| Crystalline curing agent (bisphenol A) *10 | 28.0 parts |
| Crystalline curing agent (TMA) *17 | 15.0 parts |
| Non-crystalline curing agent (OCN90) *2 | 10.0 parts |
| Curing accelerator (EPICURE P-200) *3 | 1.5 parts |

*1–3, 10 and 14: the same as above
*17: Trimellitic anhydride (Melting point 167° C.)

The powder coating compositions obtained in Examples 6–9 were then tested for their anti-blocking property, adhesion strength in shear and flow rate in the same manner as described above. Also tested was the stability of each of the compositions. Thus, sample composition was maintained at 40° C. under a relative humidity of 70% for 7 days. Then, the flow rate was measured in the manner described previously. Stability is expressed by $FL_1/FL_0 \times 100$ (%) wherein $FL_1$ and $FL_0$ are flow rates of the sample after and before the test, respectively. The results are summarized in Table 2.

TABLE 2

| | Adhesion Strength (kg/cm²) | Anti-Blocking Property | Flow Rate | Stability (%) |
|---|---|---|---|---|
| Example 6 | 208 | good | 27.1 | 82 |
| Example 7 | 220 | good | 37.0 | 93 |
| Example 8 | 203 | good | 44.0 | 84 |
| Example 9 | 297 | good | 30.1 | 81 |

What is claimed is:

1. A powder coating composition comprising:
   one or more crystalline substances, one of which is a particulate ingredient (a) having a melting point Mp which is lower than those of the other crystalline substances, and
   one or more non-crystalline substances, one of which is a particulate ingredient (b) having a glass transition point Tg which is lower than those of the other non-crystalline substances and which is lower than said melting point Mp, wherein said crystalline and non-crystalline substances both include a combination of an epoxy resin and 0.7–1.5 equivalents of a curing agent per equivalent of epoxy groups in said epoxy resin and wherein said crystalline and non-crystalline substances have been maintained at a temperature which is higher than said glass transition point Tg of said ingredient (b) but lower than said melting point Mp of said ingredient (a) and which is lower than any softening point of said one or more non-crystalline substances so that the particles of said crystalline and non-crystalline substances are bonded with each other with said ingredient (b) serving as a binder, wherein the total amount of said one or more non-crystalline substances is in the range of 20 to 60 parts by weight per 100 parts by weight of the total of said one or more crystalline substances, wherein non-crystalline epoxy resin is 5–25% by weight of the total of said epoxy resin and wherein the crystalline curing agent is 58.8–81.1% by weight of the total of said curing agent.

2. A composition according to claim 1, wherein the amount of said ingredient (b) is at least 10% by weight based on the total amount of said one or more non-crystalline substances.

3. A composition according to claim 1, wherein said glass transition point Tg is in the range of 15°–75° C.

4. A composition according to claim 1, further comprising an organic solid material which is reactive with the epoxy resin or resins and which is selected from the group consisting of bismaleimide resins, bismaleimide-triazine resins, butyral resins and polyols.

5. A composition according to claim 1, further comprising a curing accelerator.

6. A composition according to claim 1 wherein the crystalline epoxy resin is at least one member selected from the group consisting of triglycidyl isocyanurate, epoxypropoxydimethylbenzylacrylamide, hydroquinone diglycidyl ether, bisphenol S diglycidyl ether, tetramethylbisphenol diglycidyl ether, 2,5-di-t-butylhydroquinone diglycidyl ether and terephthalic acid diglycidyl ester.

7. A composition according to claim 1 wherein the crystalline curing agent is at least one member selected from the group consisting of 5-(2,5-dioxotetrahydrofroryl)-3-methyl-3-cyclohexene-1,2-dicarboxylic anhydride, tetrahydrophthalic anhydride, bisphenol A, bisphenol S, organic acid hydrizides, and dicyanodiamide.

8. A composition according to claim 1 wherein the non-crystalline epoxy resin is at least one member selected from the group consisting of bisphenol A diglycidyl ether and o-cresol novolak epoxy resin.

9. A composition according to claim 1 wherein the non-crystalline curing agent is at least one member selected from the group consisting of phenol novolak resin and o-cresol novolak resin.

10. A composition according to claim 1, wherein the crystalline epoxy resin is at least one member selected from the group consisting of triglycidyl isocyanurate, epoxypropoxydimethylbenzylacrylamide, hydroquinone diglycidyl ether, bisphenol S diglycidyl ether, tetramethylbisphenol diglycidyl ether, 2,5-di-t-butylhydroquinone diglycidyl ether and terephthalic acid diglycidyl ester;
- wherein the crystalline curing agent is at least one member selected from the group consisting of 5-(2,5-dioxotetrahydrofroryl)-3-methyl- 3-cyclohexene-1,2-dicarboxylic anhydride, tetrahydrophthalic anhydride, bisphenol A, bisphenol S, organic acid hydrizides, and dicyanodiamide;
- wherein the non-crystalline epoxy resin is at least one member selected from the group consisting of bisphenol A diglycidyl ether and o-cresol novolak epoxy resin; and
- wherein the non-crystalline curing agent is at least one member selected from the group consisting of phenol novolak resin and o-cresol novolak resin.

11. A composition according to claim 1 wherein the total amount of said one or more non-crystalline substances is in the range of 20 to 50 parts by weight per 100 parts by weight of the total of said one or more crystalline substances.

12. A process for the preparation of a powder coating composition, comprising the steps of:
- (a) providing a mixture containing one or more crystalline substances one of which has a melting point Mp which is lower than those of the other crystalline substances, and one or more non-crystalline substances one of which has a glass transition point Tg which is lower than those of the other non-crystalline substances and which is lower than said melting point Mp, wherein said crystalline and non-crystalline substances are selected from epoxy resins and curing agents and include a combination of an epoxy resin and a curing agent;
- (b) maintaining said mixture at a temperature which is higher than said glass transition point Tg but lower than said melting point Mp and which is lower than any softening point of said one or more non-crystalline substances so that said crystalline substances and non-crystalline substances are bonded with each other with said non-crystalline substance having the glass transition point Tg serving as a binder;
- (c) then cooling the mixture obtained in step (b) to a temperature lower than said glass transition point Tg; and
- (d) then pulverizing the cooled mixture obtained in step (c).

13. A process according to claim 12, wherein said step (b) is performed at an ambient pressure and at a temperature higher by at least 15° C. than said glass transition point Tg.

14. A process according to claim 12, wherein said step (b) is performed while pressing said mixture at a pressure of 50–300 kg/cm$^2$.

15. A process according to claim 14, wherein said melting point Mp is at least 90° C. and said one or more non-crystalline substances have a softening point of at least 50° C.

16. A process according to claim 15, wherein said non-crystalline substance having the glass transition point Tg is an epoxy resin and said Tg is in the range of 15°–75° C.

17. A process according to claim 12, wherein the total amount of said one or more non-crystalline substances is in the range of 15 to 70 parts by weight per 100 parts by weight of the total of said one or more crystalline substances.

18. A process according to claim 12, wherein the amount of said non-crystalline substance having the glass transition point Tg is at least 10% by weight based on the total amount of said one or more non-crystalline substances.

* * * * *

UNITED STATES PATENT AND TRADEMARK OFFICE
CERTIFICATE OF CORRECTION

PATENT NO. : 5,414,058 (as reprinted)
DATED : May 9, 1995
INVENTOR(S) : ONO et al It is certified that error appears in the above-indentified patent and that said Letters Patent is hereby corrected as shown below:

Col. 11, line 67, "(1)(3)" should read --(1)-(3)--.

Signed and Sealed this

Sixteenth Day of March, 1999

Attest:

Q. TODD DICKINSON

Attesting Officer

Acting Commissioner of Patents and Trademarks